(12) United States Patent
Bratt et al.

(10) Patent No.: US 8,669,993 B2
(45) Date of Patent: Mar. 11, 2014

(54) USER INTERFACE UNIT FOR FETCHING ONLY ACTIVE REGIONS OF A FRAME

(75) Inventors: Joseph P. Bratt, San Jose, CA (US); Shing Choo, San Francisco, CA (US); Peter F. Holland, Sunnyvale, CA (US); Timothy J. Millet, Mountain View, CA (US)

(73) Assignee: Apple Inc., Cupertino, CA (US)

(*) Notice: Subject to any disclaimer, the term of this patent is extended or adjusted under 35 U.S.C. 154(b) by 1066 days.

(21) Appl. No.: 12/685,152

(22) Filed: Jan. 11, 2010

(65) Prior Publication Data

US 2011/0169847 A1  Jul. 14, 2011

(51) Int. Cl.
*G09G 5/36* (2006.01)
*G06F 13/00* (2006.01)

(52) U.S. Cl.
USPC ............................ 345/545; 345/537; 345/538

(58) Field of Classification Search
USPC .......................................... 345/545, 537, 538
See application file for complete search history.

(56) References Cited

U.S. PATENT DOCUMENTS

| | | | |
|---|---|---|---|
| 6,396,473 B1 | 5/2002 | Callahan et al. | |
| 6,570,574 B1 | 5/2003 | Cook | |
| 6,801,203 B1 | 10/2004 | Hussain | |
| 6,919,902 B2 | 7/2005 | Jeffrey et al. | |
| 7,034,791 B1 * | 4/2006 | Odom | 345/98 |
| 7,310,100 B2 | 12/2007 | Hussain | |
| 7,471,298 B1 | 12/2008 | Noonburg | |
| 2008/0001967 A1 * | 1/2008 | Rengarajan et al. | 345/629 |
| 2009/0135916 A1 | 5/2009 | Lee | |
| 2009/0310947 A1 | 12/2009 | Chillie | |

FOREIGN PATENT DOCUMENTS

JP     2007-170834     7/2007

OTHER PUBLICATIONS

International Search Report and Written Opinion for PCT/US2011/020254, mailed Apr. 26, 2011, 13 pages, Apple, Inc.
Office Action from Mexican Patent Application No. MX/a/2012/008070, mailed Aug. 1, 2013 (English Translation), pp. 1-2.
First Patent Examination Report in related Australian Patent Application No. 2011203640, Jun. 11, 2013, pp. 1-4.
Examination Report in related Patent Application No. GB1212303.0, Jun. 6, 2013, pp. 1-2.
Office Action from Korean Patent Application No. 10-2012-7021145, mailed Nov. 29, 2013, Korean and English Versions, pp. 1-12.

* cited by examiner

*Primary Examiner* — Hau Nguyen
(74) *Attorney, Agent, or Firm* — Lawrence J. Merkel; Meyertons, Hood, Kivlin, Kowert & Goetzel, P.C.

(57) ABSTRACT

A user interface unit in a graphics processing display pipe may include registers programmable with information that defines active regions of an image frame. Pixels within the active regions of the image frame are meant to be displayed, while pixels outside of the active regions of the image frame are not to be displayed. Fetch circuitry within the user interface unit may fetch frames from memory, fetching only the pixels within the active regions of the image frames as defined by the programmed contents of the registers. The user interface unit may then provide the fetched pixels to a blend unit to blend the fetched pixels with pixels from other frames or pixels of a video stream to produce output frames. When blended with pixels of a video stream, the fetched pixels may be displayed as a graphics overlay on top of the video stream.

23 Claims, 6 Drawing Sheets

USER INTERFACE UNIT FOR FETCHING ONLY ACTIVE REGIONS OF A FRAME

BACKGROUND

1. Field of the Invention

This invention is related to the field of graphical information processing, more particularly, to fetching image pixels from memory.

2. Description of the Related Art

Part of the operation of many computer systems, including portable digital devices such as mobile phones, notebook computers and the like is the use of some type of display device, such as a liquid crystal display (LCD), to display images, video information/streams, and data. Accordingly, these systems typically incorporate functionality for generating images and data, including video information, which are subsequently output to the display device. Such devices typically include video graphics circuitry to process images and video information for subsequent display.

In digital imaging, the smallest item of information in an image is called a "picture element", more generally referred to as a "pixel". For convenience, pixels are generally arranged in a regular two-dimensional grid. By using this arrangement, many common operations can be implemented by uniformly applying the same operation to each pixel independently. Since each pixel is an elemental part of a digital image, a greater number of pixels can provide a more accurate representation of the digital image. The intensity of each pixel can vary, and in color systems each pixel has typically three or four components such as red, green, blue, and black.

Most images and video information displayed on display devices such as LCD screens are interpreted as a succession of image frames, or frames for short. While generally a frame is one of the many still images that make up a complete moving picture or video stream, a frame can also be interpreted more broadly as simply a still image displayed on a digital (discrete, or progressive scan) display. A frame typically consists of a specified number of pixels according to the resolution of the image/video frame. Most graphics systems use frame buffers to store the pixels for image and video frame information. The term "frame buffer" therefore often denotes the actual memory used to hold picture/video frames. The information in a frame buffer typically consists of color values for every pixel to be displayed on the screen. Color values are commonly stored in 1-bit monochrome, 4-bit palletized, 8-bit palletized, 16-bit high color and 24-bit true color formats. An additional alpha channel is oftentimes used to retain information about pixel transparency. The total amount of the memory required for frame buffers to store image/video information depends on the resolution of the output signal, and on the color depth and palette size.

The frame buffers can be situated in memory elements dedicated to store image and video information, or they can be situated in the system memory. Consequently, system memory may be used to store a set of pixel data that defines an image and/or video stream for display on a display device. Typically, applications running in such a system can write the pixel data into the system memory, from where the pixel data may be obtained to eventually generate a set of image/video signals for generating the image on the display device. In such systems, fetching the frames (pixel information) from system memory may place high demands on the system, as other devices may also be competing for memory access. As consequence, a high bandwidth may be required from memory in order to keep up with the requests for data. In addition, as each system memory access requires a certain amount of processing power, requests for high volume pixel data may eventually result in premature battery depletion in battery-operated devices, such as mobile phones and notebook computers.

SUMMARY

In one set of embodiments, display pipes in a graphics processing/display system may support user interface units that include registers programmable to define active regions of a frame, where pixels within the active regions of the frame are to be displayed and pixels outside of the active regions of the frame are not to be displayed. The interface units may fetch frames from memory by fetching only the pixels within the active regions of the frame as defined by the programmed contents of the registers. The user interface unit may provide the fetched pixels to a blend unit to blend the fetched pixels with pixels from other frames and/or pixels from a video stream to produce output frames for display. The pixels outside the active regions may be treated as having an Alpha value of zero for blending (in other words, having a blending value of zero), resulting in those pixels having no effect on the resulting output frames that are displayed.

In one set embodiments, the user interface unit may fill non-active regions of the frame with pixels identified as being transparent, that is, pixels having an Alpha value of zero, and provide the entire frame to the blend unit including the fetched pixels. In other embodiments, the blend unit may only receive the fetched pixels from the interface unit, and treat areas outside the active region as if they included pixels having an Alpha value of zero. The registers within the interface unit may also be programmed with other information pertaining to the image frames, for example a base address and size of the frame, among others.

In one set of embodiments, a display pipe may include a host interface unit configured to interface with system memory, and user interface units coupled to the host interface unit. The user interface units may hold frame information defining respective active regions within image frames, where pixels within the respective active regions of the frames are meant to be displayed, and pixels outside of the respective active regions of the frames are not meant to be displayed. The user interface units may fetch from the system memory through the host interface unit the pixels within the respective active regions of the frames as defined by the frame information, for displaying the fetched pixels in corresponding output frames. The display pipe may also include a blend unit coupled to the user interface units, to receive the fetched pixels provided by the user interface units. The blend unit is configured to blend the fetched pixels with a video stream to produce the corresponding output frames for display. The video stream may be produced from video information acquired from the system memory through the host interface unit by a video pipe coupled to the host interface unit and to the blend unit.

In one set of embodiments, the programmed information into the registers within the user interface units may be written by software executing on a processing unit of the system in which the display pipes are configured. The software may also write the frame information and video information, more specifically the pixels of the image frames and the video stream, into frame buffers in the system memory, from where the video pipe and user interface units may respectively acquire that information.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Figure 1:
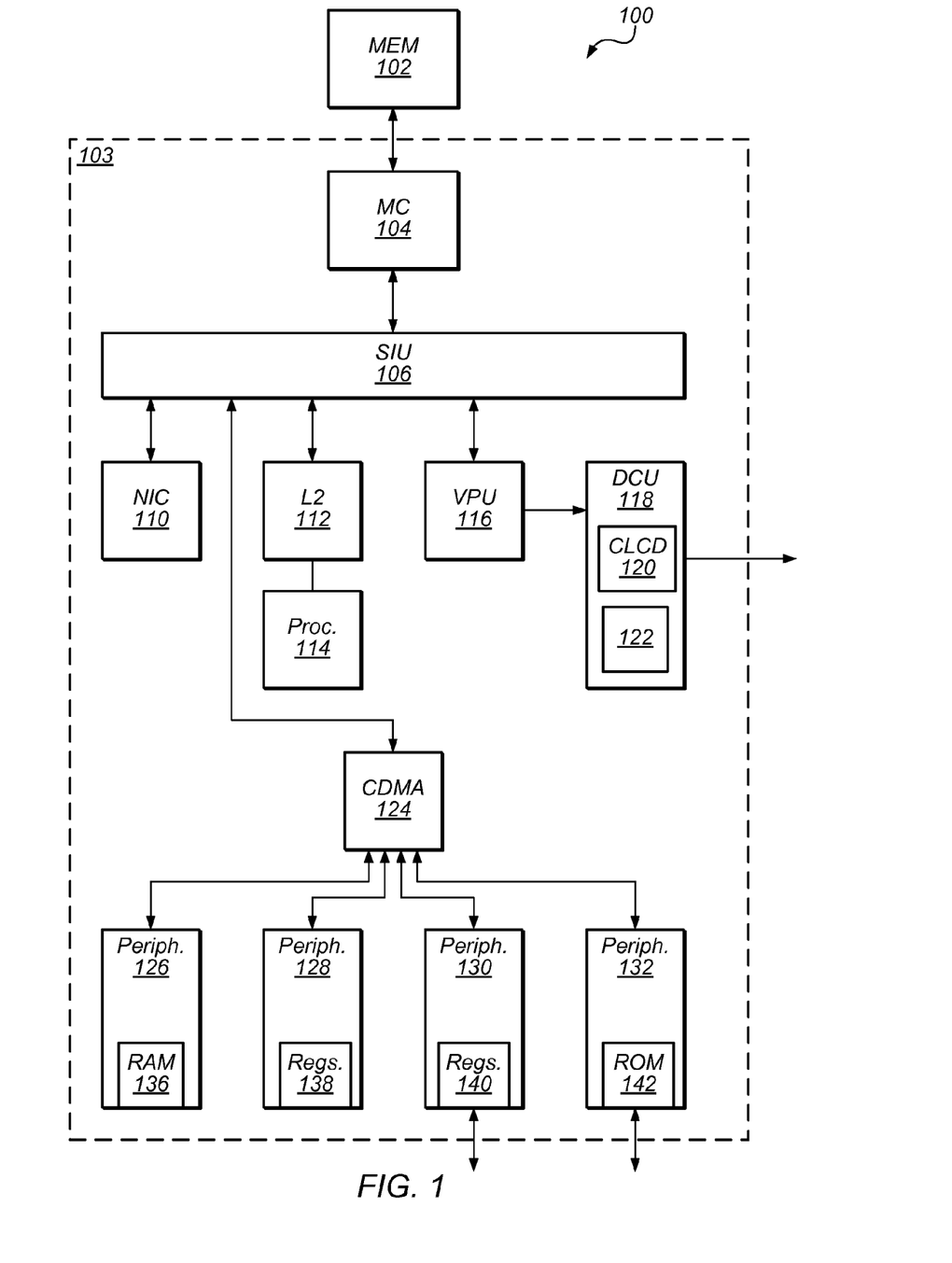
FIG. 1 is a block diagram of one embodiment of an integrated circuit that include a graphics display system.

Turning now to FIG. 1, a block diagram of one embodiment of a system 100 that includes an integrated circuit 103 coupled to external memory 102 is shown. In the illustrated embodiment, integrated circuit 103 includes a memory controller 104, a system interface unit (SIU) 106, a set of peripheral components such as components 126-128, a central DMA (CDMA) controller 124, a network interface controller (NIC) 110, a processor 114 with a level 2 (L2) cache 112, and a video processing unit (VPU) 116 coupled to a display control unit (DCU) 118. One or more of the peripheral components may include memories, such as random access memory (RAM) 136 in peripheral component 126 and read-only memory (ROM) 142 in peripheral component 132. One or more peripheral components 126-132 may also include registers (e.g. registers 138 in peripheral component 128 and registers 140 in peripheral component 130 in FIG. 1). Memory controller 104 is coupled to a memory interface, which may couple to memory 102, and is also coupled to SIU 106. CDMA controller 124, and L2 cache 112 are also coupled to SIU 106 in the illustrated embodiment. L2 cache 112 is coupled to processor 114, and CDMA controller 124 is coupled to peripheral components 126-132. One or more peripheral components 126-132, such as peripheral components 140 and 142, may be coupled to external interfaces as well.

SIU 106 may be an interconnect over which the memory controller 104, peripheral components NIC 110 and VPU 116, processor 114 (through L2 cache 112), L2 cache 112, and CDMA controller 124 may communicate. SIU 106 may implement any type of interconnect (e.g. a bus, a packet interface, point to point links, etc.). SIU 106 may be a hierarchy of interconnects, in some embodiments. CDMA controller 124 may be configured to perform DMA operations between memory 102 and/or various peripheral components 126-132. NIC 110 and VPU 116 may be coupled to SIU 106 directly and may perform their own data transfers to/from memory 102, as needed. NIC 110 and VPU 116 may include their own DMA controllers, for example. In other embodiments, NIC 110 and VPU 116 may also perform transfers through CDMA controller 124. Various embodiments may include any number of peripheral components coupled through the CDMA controller 124 and/or directly to the SIU 106. DCU 118 may include a display control unit (CLDC) 120 and buffers/registers 122. CLDC 120 may provide image/video data to a display, such as a liquid crystal display (LCD), for example. DCU 118 may receive the image/video data from VPU 116, which may obtain image/video frame information from memory 102 as required, to produce the image/video data for display, provided to DCU 118.

Processor 114 (and more particularly, instructions executed by processor 114) may program CDMA controller 124 to perform DMA operations. Various embodiments may program CDMA controller 124 in various ways. For example, DMA descriptors may be written to the memory 102, describing the DMA operations to be performed, and CDMA controller 124 may include registers that are programmable to locate the DMA descriptors in the memory 102. The DMA descriptors may include data indicating the source and target of the DMA operation, where the DMA operation transfers data from the source to the target. The size of the DMA transfer (e.g. number of bytes) may be indicated in the descriptor. Termination handling (e.g. interrupt the processor, write the descriptor to indicate termination, etc.) may be specified in the descriptor. Multiple descriptors may be created for a DMA channel, and the DMA operations described in the descriptors may be performed as specified. Alternatively, the CDMA controller 124 may include registers that are programmable to describe the DMA operations to be performed, and programming the CDMA controller 124 may include writing the registers.

Generally, a DMA operation may be a transfer of data from a source to a target that is performed by hardware separate from a processor that executes instructions. The hardware may be programmed using instructions executed by the processor, but the transfer itself is performed by the hardware independent of instruction execution in the processor. At least one of the source and target may be a memory. The memory may be the system memory (e.g. the memory 102), or may be an internal memory in the integrated circuit 103, in some embodiments. For example, a peripheral component 126-132 may include a memory that may be a source or target. In the illustrated embodiment, peripheral component 132 includes the ROM 142 that may be a source of a DMA operation. Some DMA operations may have memory as a source and a target (e.g. a first memory region in memory 102 may store the data to be transferred and a second memory region may be the target to which the data may be transferred). Such DMA operations may be referred to as "memory-to-memory" DMA operations or copy operations. Other DMA operations may have a peripheral component as a source or target. The peripheral component may be coupled to an external interface on which the DMA data is to be transferred or on which the DMA data is to be received. For example, peripheral components 130 and 132 may be coupled to interfaces onto which DMA data is to be transferred or on which the DMA data is to be received.

CDMA controller 124 may support multiple DMA channels. Each DMA channel may be programmable to perform a DMA via a descriptor, and the DMA operations on the DMA channels may proceed in parallel. Generally, a DMA channel may be a logical transfer path from a source to a target. Each channel may be logically independent of other DMA channels. That is, the transfer of data on one channel may not logically depend on the transfer of data on another channel. If two or more DMA channels are programmed with DMA operations, CDMA controller 124 may be configured to perform the transfers concurrently. For example, CDMA controller 124 may alternate reading portions of the data from the source of each DMA operation and writing the portions to the targets. CDMA controller 124 may transfer a cache block of data at a time, alternating channels between cache blocks, or may transfer other sizes such as a word (e.g. 4 bytes or 8 bytes) at a time and alternate between words. Any mechanism for supporting multiple DMA operations proceeding concurrently may be used.

CDMA controller 124 may include buffers to store data that is being transferred from a source to a destination, although the buffers may only be used for transitory storage. Thus, a DMA operation may include CDMA controller 124 reading data from the source and writing data to the destination. The data may thus flow through the CDMA controller 124 as part of the DMA operation. Particularly, DMA data for a DMA read from memory 124 may flow through memory controller 104, over SIU 106, through CDMA controller 124, to peripheral components 126-132, NIC 110, and VPU 116 (and possibly on the interface to which the peripheral component is coupled, if applicable). Data for a DMA write to memory may flow in the opposite direction. DMA read/write operations to internal memories may flow from peripheral components 126-132, NIC 110, and VPU 116 over SIU 106 as needed, through CDMA controller 124, to the other peripheral components (including NIC 110 and VPU 116) that may be involved in the DMA operation.

In one embodiment, instructions executed by the processor 114 may also communicate with one or more of peripheral components 126-132, NIC 110, VPU 116, and/or the various memories such as memory 102, or ROM 142 using read and/or write operations referred to as programmed input/output (PIO) operations. The PIO operations may have an address that is mapped by integrated circuit 103 to a peripheral component 126-132, NIC 110, or VPU 116 (and more particularly, to a register or other readable/writeable resource, such as ROM 142 or Registers 138 in the component, for example). It should also be noted, that while not explicitly shown in FIG. 1, NIC 110 and VPU 116 may also include registers or other readable/writeable resources which may be involved in PIO operations. PIO operations directed to memory 102 may have an address that is mapped by integrated circuit 103 to memory 102. Alternatively, the PIO operation may be transmitted by processor 114 in a fashion that is distinguishable from memory read/write operations (e.g. using a different command encoding then memory read/write operations on SIU 106, using a sideband signal or control signal to indicate memory vs. PIO, etc.). The PIO transmission may still include the address, which may identify the peripheral component 126-132, NIC 110, or VPU 116 (and the addressed resource) or memory 102 within a PIO address space, for such implementations.

In one embodiment, PIO operations may use the same interconnect as CDMA controller 124, and may flow through CDMA controller 124, for peripheral components that are coupled to CDMA controller 124. Thus, a PIO operation may be issued by processor 114 onto SIU 106 (through L2 cache 112, in this embodiment), to CDMA controller 124, and to the targeted peripheral component. Alternatively, the peripheral components 126-132 may be coupled to SIU 106 (much like NIC 110 and VPU 116) for PIO communications. PIO operations to peripheral components 126-132 may flow to the components directly from SIU 106 (i.e. not through CDMA controller 124) in one embodiment.

Generally, a peripheral component may comprise any desired circuitry to be included on integrated circuit 103 with the processor. A peripheral component may have a defined functionality and interface by which other components of integrated circuit 103 may communicate with the peripheral component. For example, a peripheral component such as VPU 116 may include video components such as a display pipe, which may include graphics processors, and a peripheral such as DCU 118 may include other video components such as display controller circuitry. NIC 110 may include networking components such as an Ethernet media access controller (MAC) or a wireless fidelity (WiFi) controller. Other peripherals may include audio components such as digital signal processors, mixers, etc., controllers to communicate on various interfaces such as universal serial bus (USB), peripheral component interconnect (PCI) or its variants such as PCI express (PCIe), serial peripheral interface (SPI), flash memory interface, etc.

As mentioned previously, one or more of the peripheral components 126-132, NIC 110 and VPU 116 may include registers (e.g. registers 138-140 as shown, but also registers, not shown, in NIC 110 and/or within VPU 116) that may be addressable via PIO operations. The registers may include configuration registers that configure programmable options of the peripheral components (e.g. programmable options for video and image processing in VPU 116), status registers that may be read to indicate status of the peripheral components, etc. Similarly, peripheral components may include memories such as ROM 142. ROMs may store data used by the peripheral that does not change, code to be executed by an embedded processor within the peripheral component 126-132, etc.

Memory controller 104 may be configured to receive memory requests from system interface unit 106. Memory controller 104 may be configured to access memory to complete the requests (writing received data to the memory for a write request, or providing data from memory 102 in response to a read request) using the interface defined the attached memory 102. Memory controller 104 may be configured to interface with any type of memory 102, such as dynamic random access memory (DRAM), synchronous DRAM (SDRAM), double data rate (DDR, DDR2, DDR3, etc.) SDRAM, Low Power DDR2 (LPDDR2) SDRAM, RAMBUS DRAM (RDRAM), static RAM (SRAM), etc. The memory may be arranged as multiple banks of memory, such as dual inline memory modules (DIMMs), single inline memory modules (SIMMs), etc. In one embodiment, one or more memory chips are attached to the integrated circuit 10 in a package on package (POP) or chip-on-chip (COC) configuration.

It is noted that other embodiments may include other combinations of components, including subsets or supersets of the components shown in FIG. 1 and/or other components. While one instance of a given component may be shown in FIG. 1, other embodiments may include one or more instances of the given component.

Figure 2:
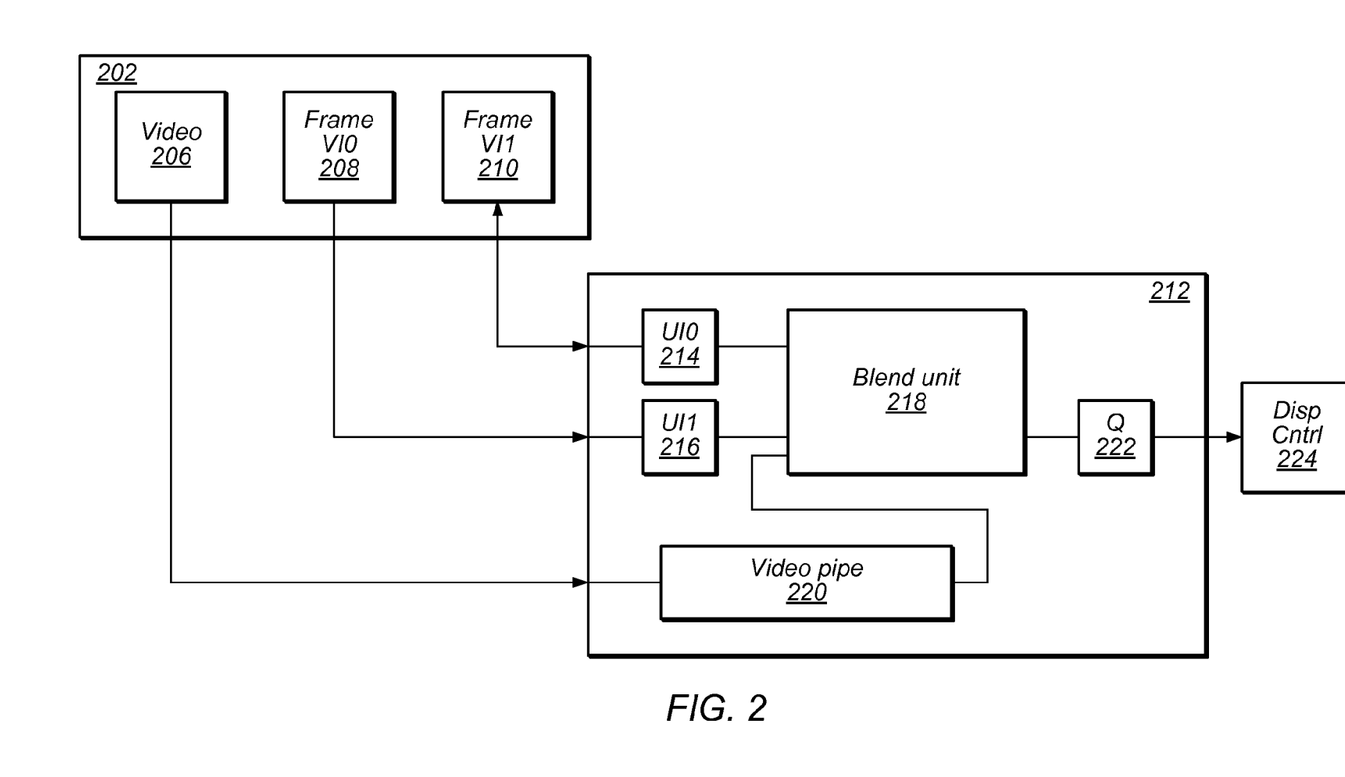
FIG. 2 is a block diagram of one embodiment of a graphics display system including system memory.

Turning now to FIG. 2, a partial block diagram is shown providing an overview of an exemplary system in which image frame information may be stored in memory 202, which may be system memory, and provided to a display pipe 212. As shown in FIG. 2, memory 202 may include a video buffer 206 for storing video frames/information, and one or more (in the embodiment shown, a total of two) image frame buffers 208 and 210 for storing image frame information. Display pipe 212 may include one or more user interface (UI) units, shown as UI 214 and 216 in the embodiment of FIG. 2, which may be coupled to memory 202 from where they may fetch the image frame data/information. A video pipe or processor 220 may be similarly configured to fetch the video data from memory 202, more specifically from video buffer 206, and perform various operations on the video data. UI 214 and 216, and video pipe 220 may respectively provide the fetched image frame information and video image information to a blend unit 218 to generate output frames that may be stored in a buffer 222, from which they may be provided to a display controller 224 for display on a display device (not shown), for example an LCD.

In one set of embodiments, UI 214 and 216 may include one or more registers programmable to define at least one active region per frame stored in buffers 208 and 210. Active regions may represent those regions within an image frame that contain pixels that are to be displayed, while pixels outside of the active region of the frame are not to be displayed. In order to reduce the number of accesses that may be required to fetch pixels from frame buffers 208 and 210, when fetching frames from memory 202 (more specifically from frame buffers 208 and 210), UI 214 and 216 may fetch only those pixels of any given frame that are within the active regions of the frame, as defined by the contents of the registers within UI 214 and 216. The pixels outside the active regions of the frame may be considered to have an alpha value corresponding to a blend value of zero. In other words, pixels outside the active regions of a frame may automatically be treated as being transparent, or having an opacity of zero, thus having no effect on the resulting display frame. Consequently, the fetched pixels may be blended with pixels from other frames, and/or from processed video frame or frames provided by video pipe 220 to blend unit 218.

Figure 3:
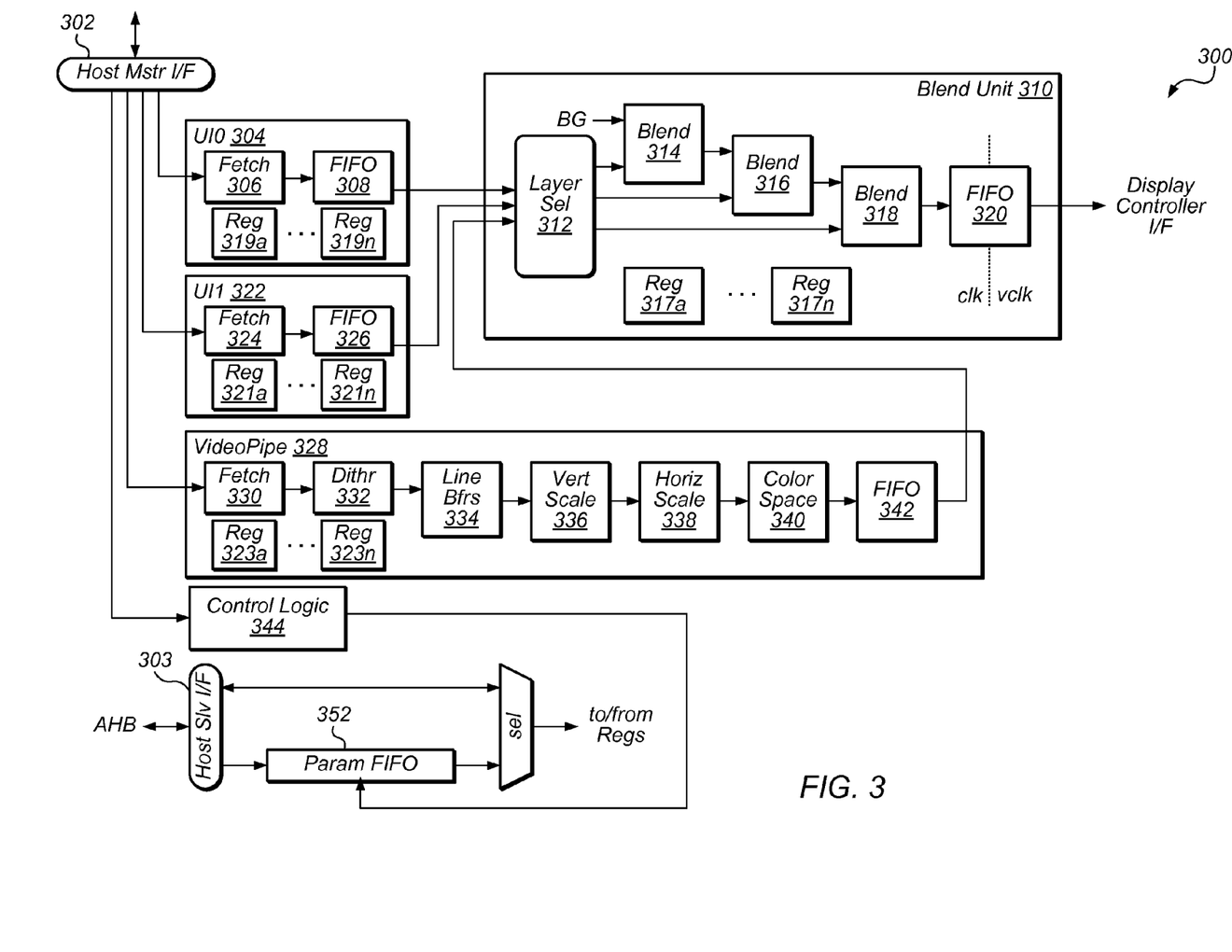
FIG. 3 is a block diagram of one embodiment of a display pipe in a graphics display system.

Turning now to FIG. 3, a more detailed logic diagram of one embodiment 300 of display pipe 212 is shown. In one set of embodiments, display pipe 300 may function to deliver graphics and video data residing in memory (or some addressable form of memory, e.g. memory 202 in FIG. 2) to a display controller or controllers that may support both LCD and analog/digital TV displays. The video data may be dithered, scaled, converted to RGB color space, and blended with up to a specified number (e.g. 2) RGB graphics (user interface) planes. Display pipe 300 may run in its own clock domain, and may provide an asynchronous interface to the display controllers to support displays of different sizes and timing requirements. Display pipe 300 may consist of one or more (in this case two) user interface (UI) blocks 304 and 322 (which may correspond to UI 214 and 216 of FIG. 2), a blend unit 310 (which may correspond to blend unit 218 of FIG. 2), a video pipe 328 (which may correspond to video pipe 220 of FIG. 2), a parameter FIFO 352, and Master and Slave Host Interfaces 302 and 303, respectively. The blocks shown in the embodiment of FIG. 3 may be modular, such that with some redesign, user interfaces and video pipes may be added or removed, or host master or slave interfaces 302 and 303 may be changed, for example.

Display pipe 300 may be designed to fetch data from memory, process that data, then presents it to an external display controller through an asynchronous FIFO 320. The display controller may control the timing of the display through a Vertical Blanking Interval (VBI) signal that may be activated at the beginning of each vertical blanking interval. This signal may cause display pipe 300 to initialize (Restart) and start (Go) the processing for a frame (more specifically, for the pixels within the frame). Between initializing and starting, configuration parameters unique to that frame may be modified. Any parameters not modified may retain their value from the previous frame. As the pixels are processed and put into output FIFO 320, the display controller may issue signals (referred to as pop signals) to remove the pixels at the display controller's clock frequency (indicated as vclk in FIG. 3).

In the embodiment shown in FIG. 3, each UI unit may include one or more registers 319a-319n and 321a-321n, respectively, to hold image frame information that may include active region information, base address information, and/or frame size information among others. Each UI unit may also include a respective fetch unit, 306 and 324, respectively, which may operate to fetch the frame information, or more specifically the pixels contained in a given frame from memory, through host master interface 302. In one set of embodiments, fetch units 306 and 324 may only fetch those pixels of any given frame that are within the active region of the given frame, as defined by the contents of registers 319a-319n and 321a-321n. The fetched pixels may be fed to respective FIFO buffers 308 and 326, from which the UI units may provide the fetched pixels to blend unit 310, more specifically to a layer select unit 312 within blend unit 310. Blend unit 310 may then blend the fetched pixels obtained from UI 304 and 322 with pixels from other frames and/or video pixels obtained from video pipe 328. The pixels may be blended in blend elements 314, 316, and 318 to produce an output frame or output frames, which may then be passed to FIFO 320 to be retrieved by a display controller interface coupling to FIFO 320, to be displayed on a display of choice, for example an LCD.

The overall operation of blend unit 310 will now be described. Blend unit 310 may be situated at the backend of display pipe 300 as shown in FIG. 3. It may receive frames of pixels from UI 304 and 322, and video pipe 328, and may blend them together layer by layer, through layer select unit 312. The final resultant pixels (which may be RGB of 10-bits each) may be queued up in output FIFO 320 at the video pipe's clock rate of clk, and fetched by a display controller at the display controller's clock rate of vclk. The sources to blend unit 310 (UI 304 and 326, and/or video pipe 328) may provide the pixel data and per-pixel Alpha values (which may be 8-bit and define the transparency for the given pixel) for an entire frame with width, display width, and height, display height, in pixels starting at a specified default pixel location, (e.g. 0,0). Blend unit 310 may functionally operate on a single layer at a time. The lowest level layer may be defined as the background color (BG, provided to blend element 314). Layer 1 may blend with layer 0 (at blend element 316). The next layer, layer 2, may blend with the output from blend element 316 (at blend element 318), and so on until all the layers are blended. For the sake of simplicity, only three blend elements 314-318 are shown, but display pipe 300 may include more or less blend elements depending on the desired number of processed layers. Each layer (starting with layer 1) may specify where its source comes from to ensure that any source may be programmatically selected to be on any layer. As mentioned above, as shown, blend unit 310 has three sources (UI 304 and 322, and video pipe 328) to be selected onto three layers (using blend elements 314-318). A CRC (cyclic redundancy check) may also be performed on the output of blend unit 310. Blend unit 310 may also be put into a CRC only mode, where only a CRC is performed on the output pixels without them being sent to the display controller.

Each source (UI 304 and 322, and video pipe 328) may provide a per pixel Alpha value. The Alpha values may be used to perform per-pixel blending, may be overridden with a static per-frame Alpha value (e.g. saturated Alpha), or may be combined with a static per-frame Alpha value (e.g. Dissolve Alpha). Any pixel locations outside of a source's valid region may not be used in the blending. The layer underneath it may show through as if that pixel location had an Alpha of zero. An Alpha of zero for a given pixel may indicate that the given pixel is invisible, and will not be displayed.

In one set of embodiments, valid source regions, referred to as active regions may be defined as the area within a frame that contains valid pixel data. Pixel data for an active region may be fetched from memory by UI 304 and 322, and stored within FIFOs 308 and 326, respectively. An active region may be specified by starting and ending (X,Y) offsets from an upper left corner (0,0) of the entire frame. The starting offsets may define the upper left corner of the active region, and the ending offsets may define the pixel location after the lower right corner of the active region. Any pixel at a location with coordinates greater than or equal to the starting offset and less than the ending offset may be considered to be in the valid region. Any number of active regions may be specified. For example, in one set of embodiments there may be up to four active regions defined within each frame and may be specified by region enable bits. The starting and ending offsets may be aligned to any pixel location. An entire frame containing the active regions may be sent to blend unit 310. Any pixels in the frame, but not in any active region would not be displayed, and may therefore not participate in the blending operation, as if the pixels outside of the active had an Alpha value of zero. In alternate embodiments, blend unit 310 may be designed to receive pixel data for only the active regions of the frame instead of receiving the entire frame, and automatically treat the areas within the frame for which it did not receive pixels as if it had received pixels having a blending value (Alpha value) of zero.

In one set of embodiments, one active region may be defined within UI 304 (in registers 319a-319n) and/or within UI 322 (in registers 321a-321n), and may be relocated within the display destination frame. Similar to how active regions within a frame may be defined, the frame may be defined by the pixel and addressing formats, but only one active region may be specified. This active region may be relocated within the destination frame by providing an X and Y pixel offset within that frame. The one active region and the destination position may be aligned to any pixel location. It should be noted that other embodiments may equally include a combination of multiple active regions being specified by storing information defining the multiple active regions in registers 319a-319n and in registers 321a-321n, and designating one or more of these active regions as active regions that may be relocated within the destination frame as described above.

In one set of embodiments, using fetch unit 330, video pipe 328 may fetch video frame data/information from memory through host master interface 302, in various formats, which may be YCbCr formats, and may insert random noise (dither) into the samples (dither unit 332), scale that data in both vertical and horizontal directions (scalers 336 and 338) after buffering the data (buffers 334), and convert the data to the RGB Color Space (color space converter unit 340). The RGB data may then be buffered (FIFO 342), and sent to blend unit 310 to be blended with other RGB planes, as previously discussed. In one set of embodiments, a parameter FIFO 352 may be used to store programming information for registers 319a-319n, 321a-321n, 317a-317n, and 323a-323n. Parameter FIFO 352 may be filled with this programming information by control logic 344, which may obtain the programming information from memory through host master interface 302. In some embodiments, parameter FIFO 352 may also be filled with the programming information through an advanced high-performance bus (AHB) via host slave interface 303.

Figure 4:
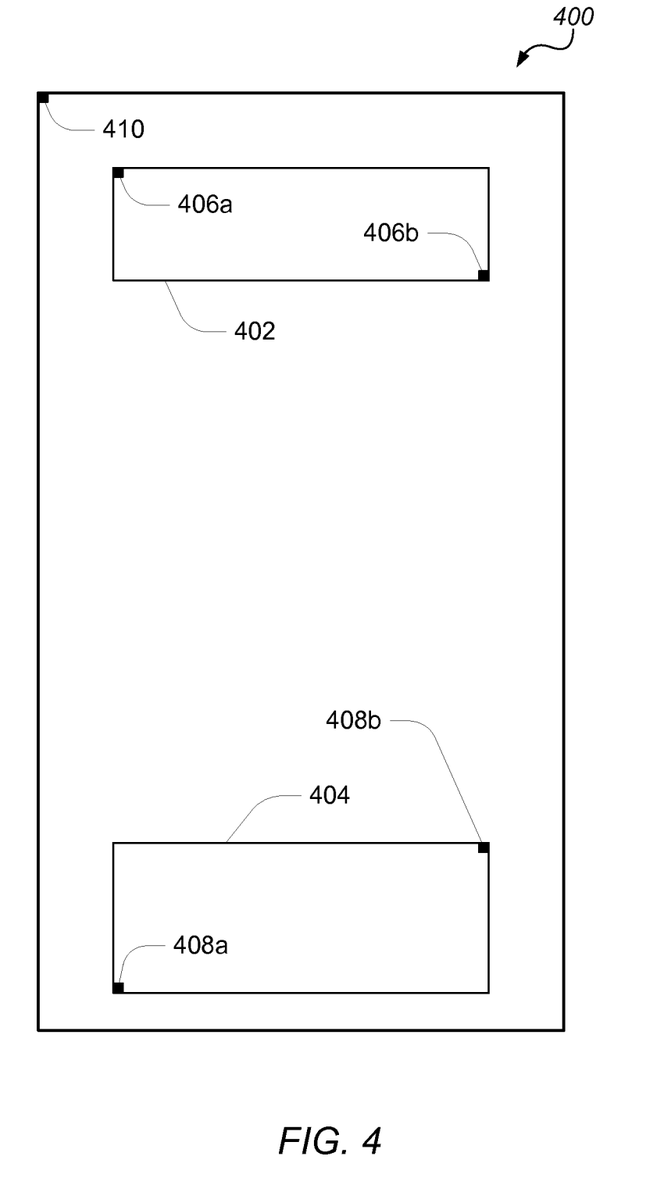
FIG. 4 is an illustration of one example of an image frame containing active regions.

Turning now to FIG. 4, an example drawing is provided of a frame 400 that includes two active regions. As previously mentioned, any number of active regions within a frame may be defined, though only two active regions are defined in example frame 400. An upper left corner pixel 410 of frame 400 may be defined as a (0,0) coordinate position, based on which active regions 402 and 404 may be defined. For example, active region 402 may be defined based on pixels 406a and 406b, defining the upper left corner and lower right corner, respectively, of active region 402. Similarly, active region 404 may be defined based on pixels 408a and 4068, defining the lower left corner and upper right corner, respectively, of active region 404. Overall, any two corners situated diametrically opposite each other within an active region may be used to define the active region. The position of the active region may then be defined by providing offset values for pixels 406a and 406b, and offset values for pixels 408a and 408b from any specified reference point of the frame, for example from the (0,0) position.

In one set of embodiments, the active regions in a frame may represent graphics overlay to appear on top of another image or a video stream. For example, the active regions may represent a static image superimposed atop a video stream. Referring again to FIG. 3, video pipe 328 may provide a video stream to blend unit 310, while UI 304 and 322 may provide image frames with pixels in the active region representing a static image overlay to be displayed atop the video stream. In this case, the output frames provided from FIFO 320 to the display controller may include video pixel information from video pipe 328, with the fetched pixels from FIFOs 308 and/or 326 superimposed on top of the video pixel information, blended together by blend unit 310 according to the Alpha values and other pertinent characteristics of the fetched pixels.

Figure 5:
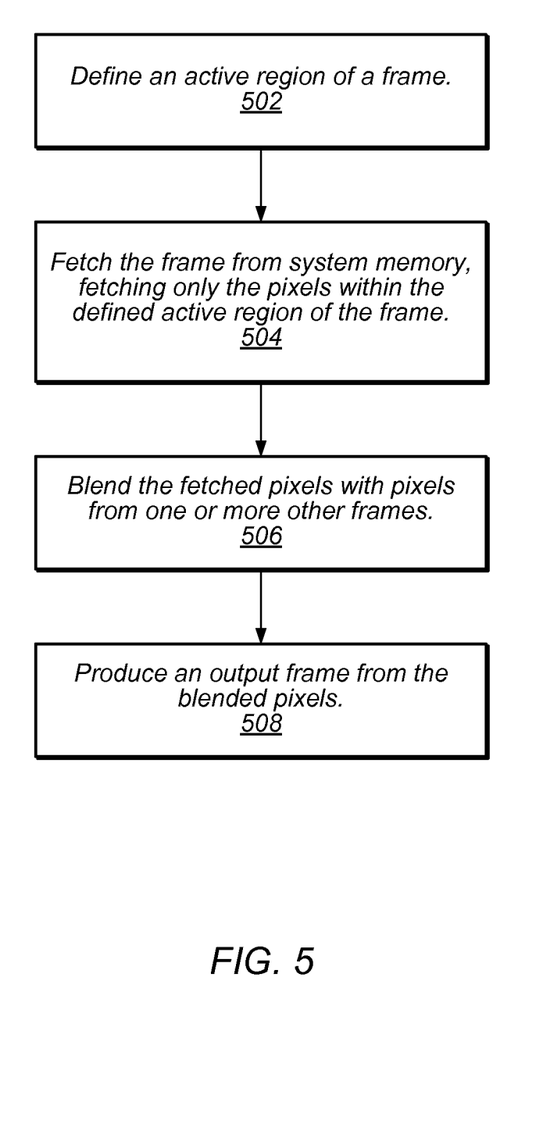
FIG. 5 is a flow chart illustrating one embodiment of a method for fetching image frame pixel information from memory.

Turning now to FIG. 5, a flowchart is shown illustrating operation of how pixels for image frames (or more specifically pixels within the image frames) may be defined and fetched in a graphics processing system, such as a display pipe. An active region of a frame may be defined (502), where pixels within the active region of the frame are to be displayed, and pixels outside the active region are not to be displayed. The frame may be fetched from a memory, which may be a system memory where the pixel information for the frame is stored, fetching only the pixels that are within the defined active region of the frame (504). The fetched pixels may then be combined with pixels from one or more other frames, or from pixels from a video stream (508). An output frame may then be produced from the blended pixels (508). In some embodiments, the output frame may be provided to a display controller for displaying on a display, such as an LCD.

Figure 6:
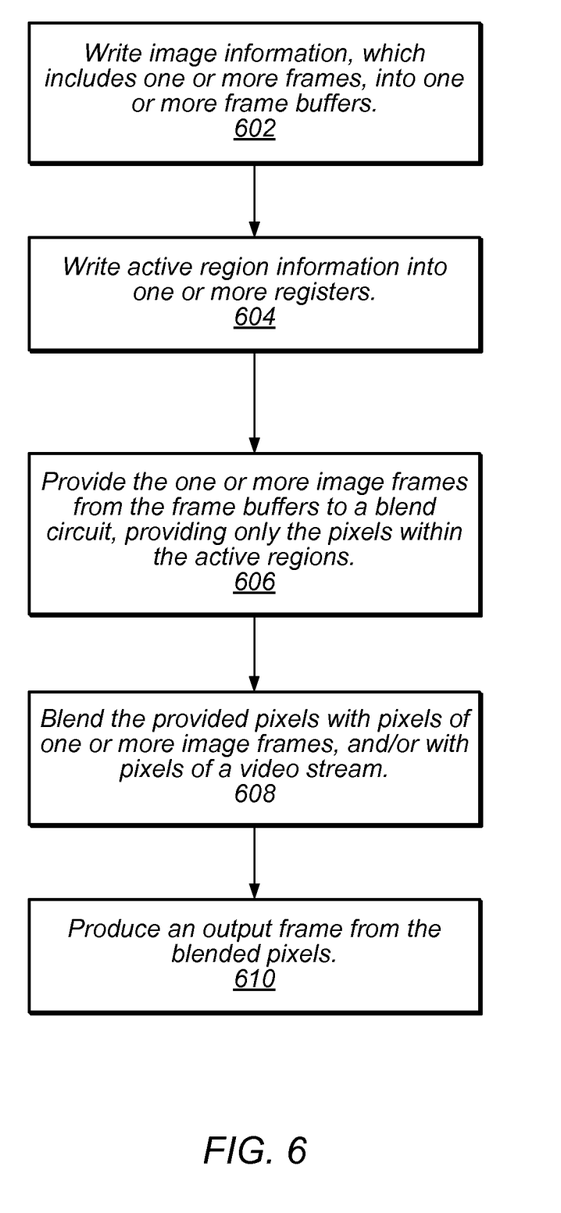
FIG. 6 is a flow chart illustrating one embodiment of a method for defining and transferring image frame pixels in a graphics display system.

Turning now to FIG. 6, a flowchart is shown illustrating operation of how image frame information may be defined and used for fetching pixels from memory in a graphics processing/display system. Software (SW) executing on a processing unit, for example, SW executing on processor 114 in the system of FIG. 1, may write image information, which may include one or more frames, into one or more frame buffers, for example, frame buffers 208 and 210 in FIG. 2 (602). The information may include pixel data of the pixels that make up each frame. The SW may also write active region information into one or more registers, for example, registers 319a-319n and 321a-321n in FIG. 3 (604), where pixels within the active region—as defined by the information written into the registers—are to be displayed, while pixels outside the active regions are not to be displayed. One or more image frames, more specifically the pixels that make up the image frames, may be provided to a blend circuit, providing only the pixels within the active regions (606). The provided pixels may then be blended with pixels for one or more other images frames and/or with pixels of a video stream (608). An output frame or output frames may be produced from the blended pixels (610) for displaying on a display of choice.

Numerous variations and modifications will become apparent to those skilled in the art once the above disclosure is fully appreciated. It is intended that the following claims be interpreted to embrace all such variations and modifications.

What is claimed is:

1. A user interface unit comprising:
   one or more registers programmable to define at least one active region of a frame, wherein pixels within the at least one active region of the frame are to be displayed and pixels outside of the at least one active region of the frame are not to be displayed; and
   fetch circuitry configured to fetch a frame from memory, wherein the fetch circuitry is configured to fetch only the pixels within the at least one active region of the frame defined by programmed contents of the one or more registers;
   wherein the user interface unit is configured to provide the fetched pixels to a blend unit configured to blend the fetched pixels with pixels from other frames to produce an output frame.

2. The user interface unit as recited in claim 1, further comprising one or more buffers coupled to the fetch circuitry;
   wherein the fetch circuitry is further configured to store the fetched pixels in the one or more buffers;
   wherein the user interface unit is configured to provide the fetched pixels to the blend unit from the one or more buffers.

3. The user interface unit as recited in claim 1, wherein the fetch circuitry is further configured to fill non-active regions of the frame with pixels identified as being transparent;
   wherein the user interface unit is configured to provide the frame comprising the fetched pixels and the pixels identified as being transparent to the blend unit.

4. The interface unit as recited claim 1, wherein the one or more registers are further programmable to define a base address and size of the frame.

5. A display pipe comprising:
   a host interface unit configured to interface with system memory;
   a plurality of user interface units coupled to the host interface unit and configured to hold frame information defining respective active regions within a plurality of frames, wherein pixels within the respective active regions of the plurality of frames are to be displayed and pixels outside of the respective active regions of the plurality of frames are not to be displayed;
   wherein the plurality of user interface units are configured to fetch from the system memory through the host interface unit the pixels within the respective active regions of the plurality of frames as defined by the frame information, for displaying the fetched pixels in corresponding output frames.

6. The display pipe as recited in claim 5, further comprising:
   a blend unit coupled to the plurality of user interface units;
   wherein the plurality of user interface units are configured to provide the fetched pixels to the blend unit; and
   wherein the blend unit is configured to blend the fetched pixels with a video stream to produce the corresponding output frames for display.

7. The display pipe as recited in claim 6, further comprising a video pipe coupled to the host interface unit and to the blend unit, and configured to fetch video information from the system memory through the host interface unit, and produce the video stream from the fetched video information.

8. A method comprising:
   defining an active region of a frame, wherein pixels within the defined active region of the frame are to be displayed and pixels outside the defined active region of the frame are not to be displayed;
   fetching the frame from system memory, comprising fetching only the pixels within the defined active region of the frame; and
   producing an output frame, comprising blending the fetched pixels with pixels from one or more other frames.

9. The method as recited in claim 8, wherein producing the output frame further comprises treating non-active regions of the frame outside the defined active region of the frame as containing pixels having a blending value of zero.

10. The method as recited in claim 8, wherein producing the output frame further comprises filling all non-active regions of the frame outside the defined active region of the frame with pixels having a blending value of zero.

11. The method as recited in claim 8, further comprising:
    fetching video information from the system memory;
    creating a video stream from the fetched video information;
    wherein producing the output frame further comprises blending the fetched pixels with the video stream.

12. The method as recited in claim 11, further comprising displaying the fetched pixels as static overlay atop the video stream.

13. The method as recited in claim 8, further comprising relocating the defined active region within the frame.

14. A method comprising:
    writing image information comprising one or more image frames into one or more frame buffers;
    writing active region information into one or more registers, wherein the active region information defines active regions of the one or more image frames, wherein pixels within the one or more image frames within the active regions of the one or more image frames are to be displayed, and pixels within the one or more image frames outside the active regions of the one or more image frames are not to be displayed; and
    providing the one or more image frames from the frame buffers to a blend circuit, comprising providing only the pixels within the active regions of the one or more image frames as defined by the active region information.

15. The method as recited in claim 14, further comprising producing an output frame, comprising blending the provided pixels with one or more of:
   pixels of one or more other image frames; or
   pixels of a video stream.

16. The method as recited in claim 15, further comprising providing the output frame to a display controller for displaying the output frame on a display.

17. The method as recited in claim 14, wherein the frame buffers are comprised in system memory, and the one or more registers are comprised in a display pipe.

18. The method as recited in claim 14, wherein the writing of the active region information and the writing of the image information are performed by software executing on one of:
   a processing unit in a system comprising the frame buffers and the one or more registers;
   a processing unit in a system coupled to the frame buffers and to the one or more registers; or
   a processing unit in a system comprising the frame buffers and coupled to the one or more registers.

19. A system comprising:
   system memory comprising:
      at least one frame buffer configured to store image frame information that defines corresponding image frames; and
      a video buffer configured to store video frame information defining corresponding video frames;
   at least one register configured to store active region information that defines respective active regions of the image frames, wherein pixels within the respective active regions of the image frames are to be displayed and pixels outside of the respective active regions of the image frames are not to be displayed;
   a first fetch unit configured to fetch the image frame information from the at least one frame buffer, wherein in fetching the image frame information the first fetch unit is configured to fetch only the image frame information defining the pixels of the image frames within the respective active regions of the image frames, responsive to the active region information stored in the at least one register;
   a second fetch unit configure to fetch the video frame information from the video buffer; and
   a blend unit configured to blend the fetched image frame information with the fetched video frame information to produce output frames.

20. The system as recited in claim 19, wherein the blend unit further comprises an output buffer configured to provide the output frames to a display at a rate commensurate with a refresh rate of the display.

21. The system as recited in claim 20, wherein the system memory is configured to store programming information executable to perform one or more of:
   write the active region information into the at least one register;
   write the image frame information into the at least one frame buffer; and
   write the video frame information into the at least one video buffer.

22. The system as recited in claim 19, wherein the blend unit is configured to treat the pixels outside of the respective active regions of the image frames as having an alpha value of zero for blending.

23. The system of claim 19, wherein the active region information comprises coordinate information for a pair of pixels, wherein the pair of pixels are situated at diagonally opposite corners of the active region.

* * * * *